(12) United States Patent
Ballinger

(10) Patent No.: US 6,201,675 B1
(45) Date of Patent: Mar. 13, 2001

(54) MONITORING SYSTEM FOR A POWER DISTRIBUTION SYSTEM AND A METHOD OF OPERATION THEREOF

(75) Inventor: Stephen D. Ballinger, Dallas, GA (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/336,940

(22) Filed: Jun. 21, 1999

(51) Int. Cl.[7] .................................................. H02H 3/00
(52) U.S. Cl. ............................. 361/63; 361/65; 361/86; 361/104; 340/638; 340/652; 307/39
(58) Field of Search .................................. 361/62, 63, 65, 361/86, 93.1, 104; 340/635, 638, 652, 654; 307/37, 38–39

(56) References Cited

U.S. PATENT DOCUMENTS 5,856,711 * 1/1999 Kato et al. ........................... 307/10.6

* cited by examiner

*Primary Examiner*—Michael J. Sherry

(57) ABSTRACT

For use in a power distribution system having first and second output power feeds having corresponding first and second circuit protection devices associated therewith, a monitoring system and a method of monitoring a utilization of the power distribution system. In one embodiment, the monitoring system includes: (1) first and second status sensors that sense statuses of the first and second circuit protection devices, respectively and (2) a controller, coupled to the first and second status sensors, that employs the statuses to determine a loading of the first and second output power feeds and calculates a utilization of the power distribution system based on the loading.

21 Claims, 2 Drawing Sheets

MONITORING SYSTEM FOR A POWER DISTRIBUTION SYSTEM AND A METHOD OF OPERATION THEREOF

TECHNICAL FIELD OF THE INVENTION

The present invention is directed, in general, to power electronics and, more specifically, to a monitoring system for a power distribution system and a method of operation thereof.

BACKGROUND OF THE INVENTION

Power distribution equipment is commonly employed in power stations and power plants to deliver power to connected loads. Classically, the systems of this nature consist of a power distribution bay that receives power from a source and distributes that power to the loads by way of output power feeds. Circuit protection devices (e.g., fuses, circuit breakers), located within the bays, protect the loads from excessively high currents and voltages. Once a load is connected to one of the feeds, current flows through the circuit protection device of the output power feeds and to the load.

As with most electronic power supply equipment, it is advantageous to efficiently make use of the power distribution equipment. In order to maximize the use of the equipment, it is preferable to ascertain a utilization of the power distribution system. The utilization may be determined by comparing the portion of the equipment and circuits under use to the total circuit capacity of the power distribution system.

Presently, operators monitor the current flowing into the various power distributions bays to determine the utilization of the bay in relation to its total capacity or ampacity. In other words, the common practice is to monitor the current capacity of the bays under use. Unfortunately, this method is generally deficient in that monitoring current capacity is inaccurate and, more specifically, it does not supply adequate information as to the actual number of power feeds that are being used. Rarely does a bay exhaust its current capacity. Rather, the bay will employ all of its power feeds long before reaching its current capacity limit. Therefore, monitoring current capacity does not adequately measure the number of circuits under use in light of the total circuit capacity of the power distribution bay.

Accordingly, what is needed in the art is a monitoring system for a power distribution system that more accurately determines a circuit utilization thereof and overcomes deficiencies of the prior art.

SUMMARY OF THE INVENTION

To address the above-discussed deficiencies of the prior art, the present invention provides, for use in a power distribution system having first and second output power feeds having corresponding first and second circuit protection devices associated therewith, a monitoring system and a method of monitoring a utilization of the power distribution system. In one embodiment, the monitoring system includes: (1)first and second status sensors that sense statuses of the first and second circuit protection devices, respectively and (2) a controller, coupled to the first and second status sensors, that employs the statuses to determine a loading of the first and second output power feeds and calculates a utilization of the power distribution system based on the loading.

The present invention recognizes that monitoring the statuses of the circuit protection devices associated with respective output power feeds provides a reliable indicator of the use of the output power feeds of the power distribution system. The controller of the present invention employs the statuses to more accurately calculate the utilization of the individual output power feeds and, ultimately, of the entire power distribution system.

In one embodiment of the present invention, the power distribution system includes a plurality of output power feeds having corresponding circuit protection devices. The monitoring system is adapted to sense statuses of a plurality of circuit protection devices. The controller employs those statuses to determine a loading of the plurality of output power feeds and calculate the utilization of the power distribution system based on the loading.

In one embodiment of the present invention, the controller includes a decoder and a digital-to-analog converter (DAC). Those skilled in the art understand that alternate embodiments may include either the decoder or the DAC, but not necessarily both. In yet another embodiment, the controller may include a switch decoder, decoder and a DAC. The broad scope of the present invention, however, is not limited to any specific controller.

In one embodiment of the present invention, the first and second circuit protection devices are selected from the group consisting of a circuit breaker or fuse. Those skilled in the art recognize that other circuit protection devices are well within the broad scope of the present invention.

In one embodiment of the present invention, the controller is embodied in a sequence of instructions executable on the processor of a general purpose computer. Alternatively, the controller may be embodied in dedicated or hardwired discrete or integrated circuitry.

In one embodiment of the present invention, the statuses include first and second voltages across the first and second circuit protection devices, respectively. Those skilled in the art understand that in alternate embodiments, the statuses of the first and second circuit protection devices may be currents or other operational characteristics associated with the respective circuit protection devices or the output power feeds.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
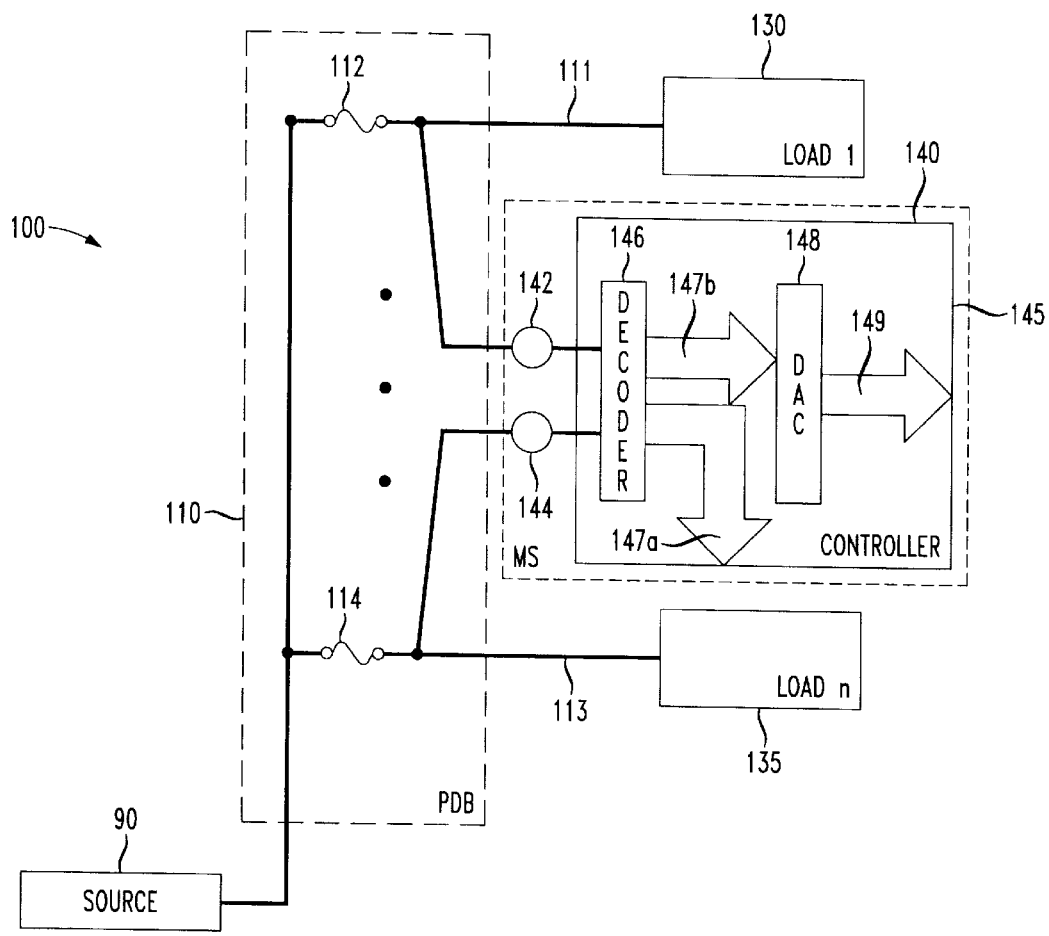
FIG. 1 illustrates a schematic diagram of power distribution system employing an embodiment of a monitoring system constructed according to principles of the present invention.

Referring initially to FIG. 1, illustrated is a schematic diagram of power distribution system (PDS) 100 employing an embodiment of a monitoring system (MS) 140 constructed according to principles of the present invention. The PDS 100 receives power from a main power source 90. The power provided by the main power source may be either alternating current (AC) of direct current (DC). The supplied power flows into a power distribution bay (PDB) 110 that contains first and second output power feeds 111, 113 having first and second circuit protection devices 112, 114 associated therewith. The first and second output power feeds 111, 113 are then coupled to loads 130, 135. The circuit protection devices 112, 114 may be circuit breakers, fuses or other devices capable of sensing statuses of the respective circuits and the respective output power feeds. Also, in other embodiments of this invention, the PDB 110 has multiple output power feeds and corresponding circuit protection devices.

The MS 140 includes first and second status sensors 142, 144 that are coupled to the first and second circuit protection devices 112, 114, respectively, to sense the statuses of the circuit protection devices 112, 114. In a preferred embodiment, the first and second status sensors 142, 144 sense the presence of a voltage across the first and second circuit protection devices 112, 114, respectively.

A controller 145 is further coupled to the outputs of the first and second status sensors 142, 144 to employ the observed statuses of the circuit protection devices 112, 114 and the associated loads to determine a loading of the first and second output power feeds 111, 113. From the determined loading of the output power feeds 111, 113, the controller 145 calculates a utilization of the PDS 100 based on the circuit utilization.

In the illustrated embodiment, the controller 145 includes a decoder 146 and a digital-to-analog converter 148. The decoder 146 receives signals from the status sensors 142, 144 indicating the statuses of the first and second circuit protection devices 112, 114. For instance, if a voltage is present across the a circuit protection device, the respective sensor generates a signal (e.g., a logic "1" state). Based on the statuses of the circuit protection devices 112, 114, as indicated by the received signals, the decoder determines the loading of the output power feeds 111, 113 and calculates the utilization of the PDS 100 in light of the loading.

Thereafter, the decoder 146 outputs first and second binary utilization signals 147a, 147b providing the utilization of the PDS 100. The first binary utilization signal 147a is sent out to be monitored by a user in a binary display (not shown) and the second binary utilization signal 147b is sent to the DAC 148 for conversion into an analog signal. The DAC 148 converts the second binary utilization signal 147b to an analog signal to be monitored by a user in an analog display (not shown).

Figure 2:
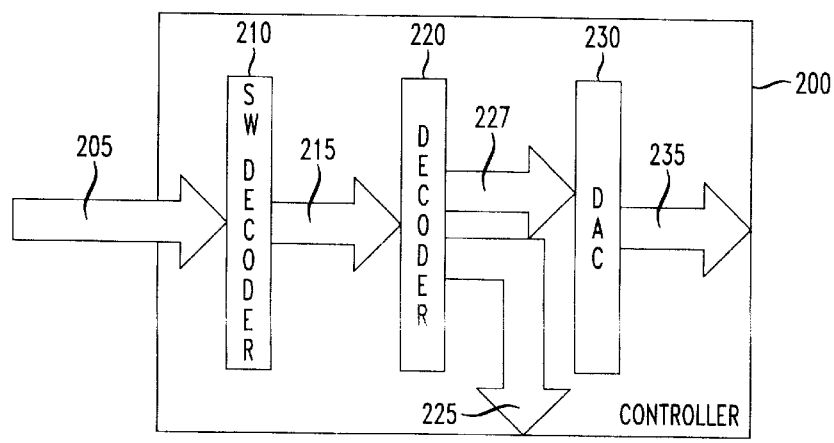
FIG. 2 illustrates a schematic diagram of another embodiment of a controller constructed according to the principles of the present invention.

Turning now to FIG. 2, illustrated is a schematic diagram of another embodiment of a controller 200 constructed according to the principles of the present invention. In this embodiment, the controller 200 includes a switch decoder 210, a main decoder 220 and a digital-to-analog converter 230. The switch decoder 210 receives status signals 205 from the status sensors (such as the status sensors 142, 144 of FIG. 1) and then compares that status signal 205 to a predetermined maximum capacity, as indicated by the switch decoder 210, of a PDB (such as the PDB 110 of FIG. 1) being monitored. The switch decoder 210 then outputs a switch decoder signal 215 to the main decoder 220. The main decoder 220 then determines the level of utilization of the PDS 100 and outputs first and second binary utilization signals 225, 227.

The first binary utilization signal 225 is sent out to be monitored by a user in a binary display (not shown). The second binary utilization signal 227 is sent to the DAC 230 for conversion into an analog signal. Accordingly, the DAC 230 converts the second binary utilization signal 227 into an analog signal to be monitored by a user in an analog display (not shown).

A difference between the embodiments illustrated in FIGS. 1 and 2 is whether the monitored PDB is capable of indicating the number of load circuits contained within. In older PDB's, the embodiment of FIG. 2 is preferable so that the number of circuits with the PDB may be manually programmed. In more recent and future models, the PDB itself may indicate to the monitoring system the number of internal circuits without a manual input.

Figure 3:
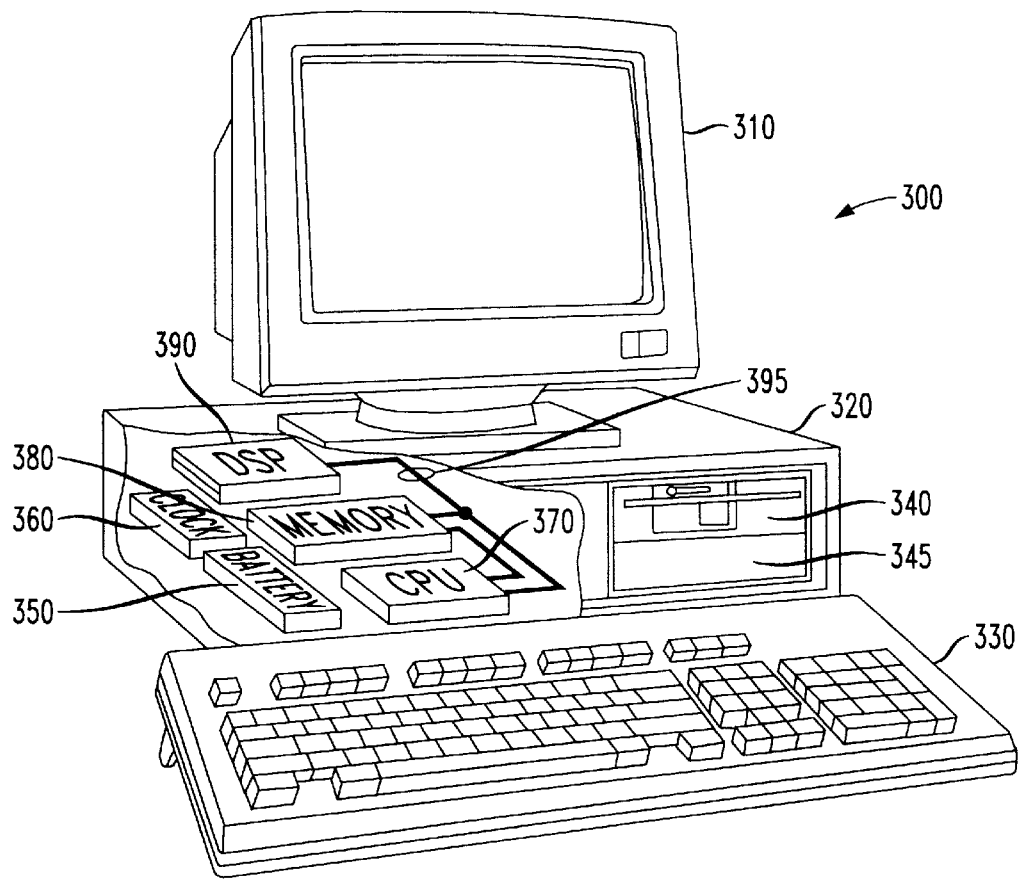
FIG. 3 illustrates a programmable general purpose computer employable with a monitoring system constructed according to the principles of the present invention.

Turning now to FIG. 3, illustrated is a programmable general purpose computer 300 employable with a monitoring system constructed according to the principles of the present invention. The computer 300 is presented as a general purpose computer capable of storing and executing a sequence of instructions to employ statuses of circuit protection devices to determine a loading of respective power feeds and calculate a utilization of a power distribution system based on the loading.

The computer 300 includes a monitor or display 310, a chassis 320 and a keyboard 330. The monitor 310 and the keyboard 330 cooperate to allow communication (e.g., via a graphical user interface, or "GUI") between the computer 300 and the user. Alternatively, the monitor 310 and keyboard 330 may be replaced by other conventional output and input devices, respectively. The chassis 320 includes both a floppy disk drive 340 and hard disk drive 345. The floppy disk drive 340 is employed to receive, read and write to removable disks; the hard disk drive 345 is employed for fast access storage and retrieval, typically to a nonremovable disk. The floppy disk drive 340 may be replaced by or combined with other conventional structures to receive and transmit data and instructions, including without limitation, tape and compact disc drives, telephony systems and devices (including videophone, paging and facsimile technologies), and serial and parallel ports.

The chassis 320 is illustrated having a cut-away portion that includes a battery 350, clock 360, processor 370 (e.g., Sun Microsystems Sparc 20 as manufactured by Sun Microsystems, Inc. of Mountain View, Calif., memory 380, digital signal processor 390 and interface 395. Although the computer 300 is illustrated having a single processor 370, hard disk drive 345 and memory 380, the computer 300 may be equipped with a plurality of processors and peripheral devices.

It should be noted that any conventional computer system having at least one processor that is suitable to function as a general purpose computer may replace, or be used in conjunction with, the computer 300, including, without limitation: hand-held, laptop/notebook, mini, mainframe and supercomputers, including RISC and parallel processing architectures, as well as within computer system/network combinations. Alternative computer system embodiments may be firmware-or hardware-based.

Figure 4:
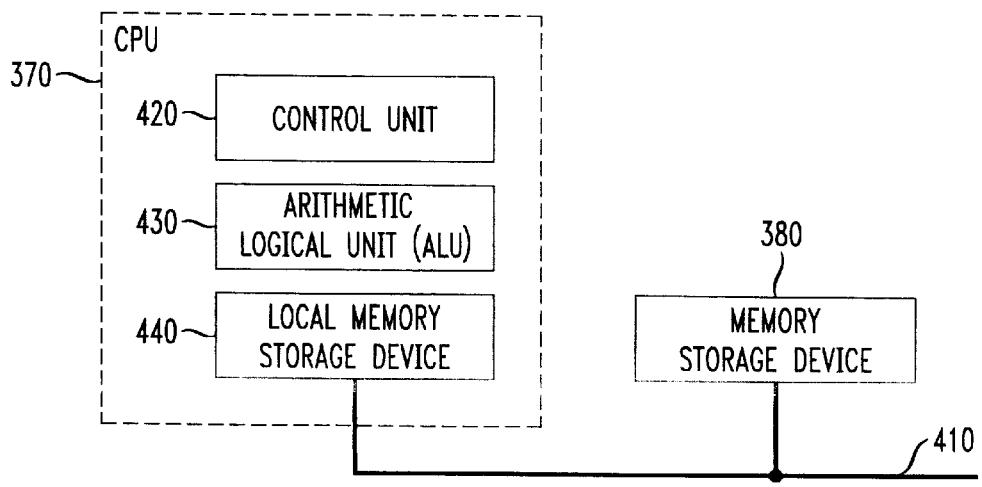
FIG. 4 illustrates a block diagram of an embodiment of the processor associated with the general purpose computer of FIG. 3.

Turning now to FIG. 4, illustrated is a block diagram of an embodiment of the processor 370 associated with the general purpose computer 300 of FIG. 3. The processor 370 is coupled to the memory 380 by a data bus 410. The memory 380 generally stores data and instructions that the processor 370 uses to execute the functions necessary to operate the computer 300. The memory 380 may be any conventional memory storage device. The processor 370 includes a control unit 420, arithmetic logic unit ("ALU") 430 and local memory 440 (e.g., stackable cache or a plurality of registers). The control unit 420 fetches the instructions from memory 380. The ALU 430, in turn, performs a plurality of operations, including addition and boolean AND, necessary to carry out the instructions fetched from the memory 380. The local memory 440 provides a local high speed storage location for storing temporary results and control information generated and employed by the ALU 430.

In alternate advantageous embodiments, the processor 370 may, in whole or in part, be replaced by or combined with any suitable processing configuration, including multi and parallel processing configurations, programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like, to form the various types of circuitry, controllers and systems described and claimed herein.

It should be noted also that while the processor 370 includes the bus configuration as illustrated, alternate configurations are well within the broad scope of the present invention. Furthermore, conventional computer system architecture is more fully discussed in *The Indispensable PC Hardware Book*, by Hans-Peter Messmer, Addison Wesley (2nd ed. 1995) and *Computer Organization and Architecture*, by William Stallings, MacMillan Publishing Co. (3rd ed. 1993); conventional computer, or communications, network design is more fully discussed in *Data Network Design*, by Darren L. Spohn, McGraw-Hill, Inc. (1993) and conventional data communications is more fully discussed in *Voice and Data Communications Handbook*, by Bud Bates and Donald Gregory, McGraw-Hill, Inc. (1996), *Data Communications Principles*, by R. D. Gitlin, J. F. Hayes and S. B. Weinstein, Plenum Press (1992) and *The Irwin Handbook of Telecommunications*, by James Harry Green, Irwin Professional Publishing (2nd ed. 1992). Each of the foregoing publications is incorporated herein by reference for all purposes.

The previously described embodiments of a power distribution system and monitoring system therefor are submitted for illustrative purposes only and other embodiments adapted to more accurately ascertain the utilization of a power distribution system are well within the broad scope of the present invention.

Although the present invention has been described in detail, those skilled in the art should understand that they can make various changes, substitutions and alterations herein without departing from the spirit and scope of the invention in its broadest form.

What is claimed is:

1. For use in a power distribution system having first and second output power feeds having corresponding first and second circuit protection devices associated therewith, a monitoring system, comprising:

first and second status sensors that sense statuses of said first and second circuit protection devices, respectively; and a controller, coupled to said first and second status sensors, that employs said statuses to determine a loading of said first and second output power feeds and calculates a utilization of said power distribution system based on said loading.

2. The monitoring system as recited in claim 1 wherein said power distribution system comprises a plurality of output power feeds having corresponding circuit protection devices, said monitoring system comprising a plurality of status sensors that sense statuses of said corresponding plurality of circuit protection devices and said controller employing said statuses to determine a loading of said plurality of output power feeds and calculating said utilization of said power distribution system based on said loading.

3. The monitoring system as recited in claim 1 wherein said controller comprises a decoder and a digital-to-analog converter (DAC).

4. The monitoring system as recited in claim 1 wherein said controller comprises a switch decoder, decoder and a DAC.

5. The monitoring system as recited in claim 1 wherein said first and second circuit protection devices are selected from the group consisting of:

a circuit breaker, and a fuse.

6. The monitoring system as recited in claim 1 wherein said controller is embodied in a sequence of instructions executable on a processor of a general purpose computer.

7. The monitoring system as recited in claim 1 wherein said statuses comprise first and second voltages across said first and second circuit protection devices, respectively.

8. For use in a power distribution system having first and second output power feeds having corresponding first and second circuit protection devices associated therewith, a method of monitoring a utilization of said power distribution system, comprising:

sense statuses of said first and second circuit protection devices;

employing said statuses to determine a loading of said first and second output power feeds; and calculating said utilization of said power distribution system based on said loading.

9. The method as recited in claim 8 wherein said power distribution system comprises a plurality of output power feeds having corresponding circuit protection devices, said method comprising sensing statuses of said corresponding of circuit protection devices, employing said statuses to determine a loading of said plurality of output power feeds and calculating said utilization of said power distribution system based on said loading.

10. The method as recited in claim 8 further comprising converting said statuses from one form to another prior to said act of employing.

11. The method as recited in claim 10 wherein said act of converting is performed by a controller comprising a decoder and a digital-to-analog converter (DAC).

12. The method as recited in claim 10 wherein said act of converting is performed by a controller comprising a switch decoder, decoder and a DAC.

13. The method as recited in claim 8 wherein said first and second circuit protection devices are selected from the group consisting of:

a circuit breaker, and a fuse.

14. The method as recited in claim 8 wherein said acts of employing and calculating are performed by a controller.

15. A power distribution system, comprising:

an input power feed;

first and second output power feeds coupled to first and second loads, respectively;

first and second circuit protection devices associated with said first and second output feeds, respectively; and a monitoring system, including:

first and second status sensors that sense statuses of said first and second circuit protection devices, respectively; and a controller, coupled to said first and second status sensors, that employs said statuses to determine a loading of said first and second output power feeds and calculates a utilization of said power distribution system based on said loading.

16. The power distribution system as recited in claim 15 further comprising a plurality of output power feeds having corresponding circuit protection devices, said monitoring system comprising a plurality of status sensors that sense statuses of corresponding plurality of circuit protection devices and said controller employing said statuses to determine a loading of said plurality of output power feeds and calculating said utilization of said power distribution system based on said loading.

17. The power distribution system as recited in claim 15 wherein said controller comprises a decoder and a digital-to-analog converter (DAC).

18. The power distribution system as recited in claim 15 wherein said controller comprises a switch decoder, decoder and a DAC.

19. The power distribution system as recited in claim 15 wherein said first and second circuit protection devices are selected from the group consisting of:

a circuit breaker, and a fuse.

20. The power distribution system as recited in claim 15 wherein said controller is embodied in a sequence of instructions executable on a processor of a general purpose computer.

21. The power distribution system as recited in claim 15 wherein said statuses comprise first and second voltages across said first and second circuit protection devices, respectively.

* * * * *